United States Patent [19]

Carson

[11] 4,065,020

[45] Dec. 27, 1977

[54] METER BOX HAVING ROTATABLE COVER AND INTERLOCKING MEANS

[75] Inventor: John Reese Carson, LaVerne, Calif.

[73] Assignee: Carson Industries, Inc., La Verne, Calif.

[21] Appl. No.: 660,061

[22] Filed: Feb. 23, 1976

Related U.S. Application Data

[63] Continuation-in-part of Ser. No. 601,047, July 30, 1975, Pat. No. 3,952,908.

[51] Int. Cl.$^2$ .................. B65D 25/24; H02G 3/08; B65D 43/16
[52] U.S. Cl. .................................. 220/18; 220/337; 220/3.8; 220/293
[58] Field of Search ................ 220/18, 334, 293, 3.8, 220/300, 337

[56] References Cited

U.S. PATENT DOCUMENTS

| 2,566,870 | 9/1951 | Beagle | 220/293 X |
|---|---|---|---|
| 2,866,572 | 12/1958 | Llewhellin | 220/293 |
| 2,883,853 | 4/1959 | Forni | 220/334 X |
| 3,655,088 | 4/1972 | Box | 220/337 |
| 3,843,013 | 10/1974 | Brooks, Jr. | 220/306 X |
| 3,858,755 | 1/1975 | Tellen | 220/337 X |
| 3,952,908 | 4/1976 | Carson | 220/18 |

Primary Examiner—William Price
Assistant Examiner—Steven M. Pollard
Attorney, Agent, or Firm—Spensley, Horn & Lubitz

[57] ABSTRACT

A meter box and a uniquely designed cover molded out of a substantially rigid plastic material is disclosed. The meter box comprises an open upper top with an upwardly extending rim member. On the inside surface of the meter box are means for supporting a cover forming a ledge member. The cover is arranged and configured to rest on the ledge confronting the rim of the box so as to substantially close the open top of the box. Disposed on the exterior of the meter box are a plurality of anchor tabs. A horizontal member is disposed between two anchor tabs adjacent the top of the meter box which enables the box to be secured in concrete and the like.

The cover may be a substantially round member or may comprise first and second sections and means for rotatably joining the first and second sections together. The first section having outwardly extending protrusions which engage slots on the meter box so as to render the first section substantially immovable therein. The second section having an opening which enables the user to lift the second section off the top of the meter box and move it about the rotation means whereby the meter box is selectively opened and closed. The meter box and cover of the present invention have particular utility because of the ease of construction, and beneficial cost versus strength ratios.

10 Claims, 7 Drawing Figures

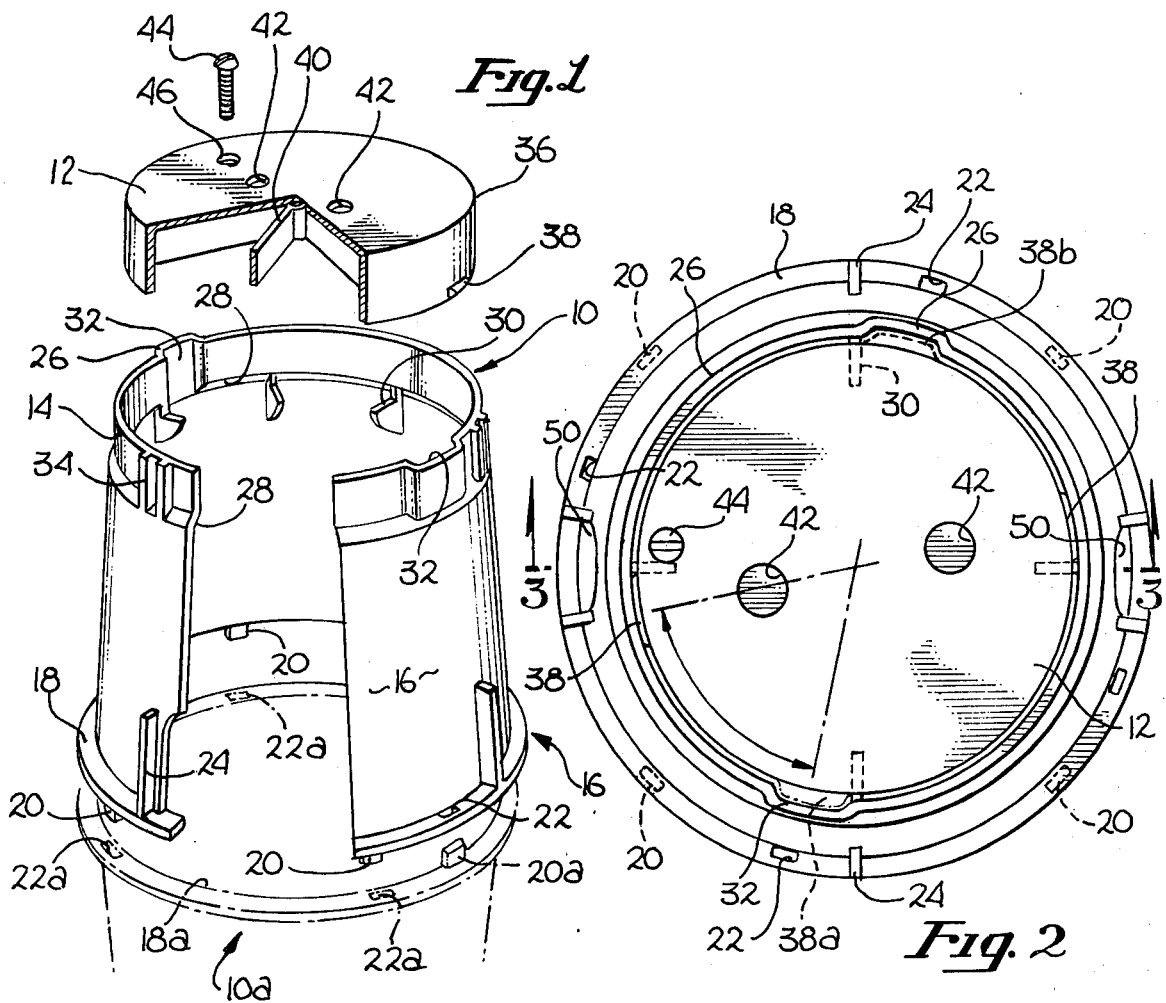
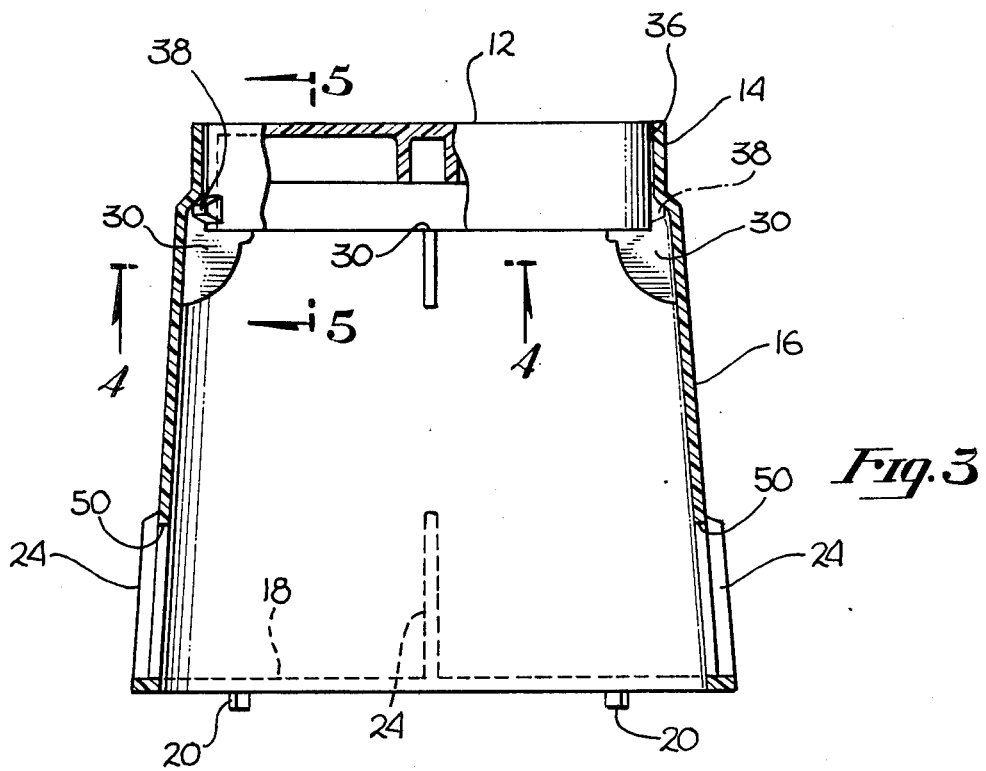

METER BOX HAVING ROTATABLE COVER AND INTERLOCKING MEANS

RELATED APPLICATIONS

This application is a continuation-in-part application of Ser. No. 601,047, filed July 30, 1975, now U.S. Pat. No. 3,952,908, issued on Apr. 27, 1966.

BACKGROUND OF THE INVENTION

1. Field of the Invention

This invention relates to the field of containers which can be set in the ground for enclosing pump regulators and the like, and more specifically, to a meter box and cover having unique design aspects.

2. Prior Art

Meter boxes are well known in the art and are generally made of molded concrete with a fitted concrete or metal cover. These types of meter boxes suffer the obvious shortcomings in that they are heavy, and are susceptible to damage. Moreover, the covers are also difficult to use in that the cover must usually be completely removed in order to gain entry into the box. The cover, being a separable unit, may be misplaced at the job site necessitating the user to replace the cover with a new one. In addition, vandals can remove such covers or carry away a cover that the user failed to replace on the box. This leaves the contents of the box exposed; a potentially dangerous situation.

Many improvements have been made to this form of meter box, an example of which is disclosed by Brooks U.S. Pat. No. 3,843,013. Brooks shows a meter box molded out of a fibrous plastic material which has a substantially rigid plastic cover held by a ledge in the meter box. In order to open the box of Brook's the first embodiment discloses the use of a tool which is inserted into the cover and bent inwardly, thereby causing the rigid cover to yieldably disengage from the box.

This assembly also contains a number of obvious shortcomings discussed with reference to concrete meter boxes. For example, the meter box of Brooks still requires the user to completely remove the cover before access into the box is possible. Again, the propensity for loss and/or theft of the cover, as well as damage to the contents of the box, is possible. In utilizing the box of Brooks, each time the box is to be opened, a substantial inward-directed force must be applied to flexible members in order to get them to pivotably rotate a substantial distance so as to disengage the cover from the box.

In a second embodiment of Brooks, a relatively complex spring and latch system and associated tool means are disclosed. Under the first method used to open the box, the force that was needed to flex the interlocking members may weaken these members and therefore render such a cover susceptible to easy and quick deterioration. In the latter alternative, the expense of a spring actuated locking system substantially increases the cost of such a meter box. Finally, the meter box of Brooks contains various engaging and opening means which are of complicated design and therefore increase the cost of construction of such a box.

Thus, the prior art assemblies are either made of concrete and are extremely heavy and suspectible to damage due to dropping and the like or are made of plastic but contain members which are expensive to make and susceptible to easy deterioration. In addition, the problem of complete removal of the meter cover remains.

There is also the fact that prior art meter boxes could not be securely positioned in concrete and the like. Should the ground drop out beneath the concrete layer, the meter box would also drop out from the concrete thereby creating a hazardous opening. In order to prevent such openings from occurring which are very likely to occur in high risk earthquake areas, many regulations exist which require the meter box to be interlockable in the concrete. In the past, various complex outwardly extending members have been used, but such members require a complex four-part molding system in order to release the outwardly extending members from the mold. Moreover, such members have not been found to provide the necessary interlocking action with the concrete.

In Patent Application Serial No. 601,047, now U.S. Pat. No. 3,952,908 one method for interlocking the meter box in the concrete was taught. This prior method included the use of openings disposed in the top of the meter box which permitted the concrete to enter the top of the meter box to some extent prior to hardening. While this method has been found to be somewhat beneficial, the present invention teaches a method which securely locks the meter box into the concrete, which is easy to manufacture, and which contains none of the other shortcomings associated with the prior art.

In the present invention, the meter box includes vertically elongated tab members which extend down the sides of the meter box. These tab members extend outwardly from the sides of the meter box and because they are vertically disposed thereon, they are easily removable from well-known plastic molding equipment. Once formed, a horizontal member can be disposed between two such tab members which horizontal member is arranged and configured so as to be interlockable in concrete and the like. Thus, the present invention provides a meter box and an associated cover which is easy to install and to use and which contains none of the shortcomings of the prior art. Because the meter box of the present invention is relatively straightforward and simple to make, it is not susceptible to the problems of excessive wear and tear, and is relatively inexpensive to produce. Thus, the above-identified problems of the meter box and cover associated with prior art boxes are overcome.

SUMMARY OF THE INVENTION

In the first embodiment of the present invention, the meter box is described which is lightweight and strong, but which can be set in the ground in the manner of a concrete box and used to protect pipes, pipe meters and the like found therein. Such meter box is also arranged and configured so as to be selectively interlockable in concrete and the like. The meter box comprises a round box having an open upper top member with an upwardly extending rim forming a ledge member therein. A plurality of inward extending support members are disposed on the inside surface of the box adjacent the top thereof and are disposed beneath the rim a predetermined distance. A cover member is arranged and configured so as to rest on the support members and is rotatable between a first open position and a second closed position. The cover has two outwardly extending protrusions which engage the ledge member when the cover is rotated. That is, when in the first position, the protrusions are disengaged from the ledge member and the cover is removable. When in the second position, the protrusions engage the ledge member thereby preventing removal of the cover from the box. The box also includes locking means disposed in the cover which means are positionable such that when the cover is in the second position, actuation of the locking means prevents the substantial rotation of the cover in any direction.

In the second embodiment of the present invvention, the meter box comprises a box having first and seconds ends and an open upper top with an upwardly extending rim member terminating on the inside surface thereof and an inwardly extending ledge member. The box has a plurality of slots disposed on the inside surface thereof above the ledge member. The bottom of the meter box has an outwardly extending ledge member terminating along the bottom thereof which helps to stabilize the box when disposed in the ground. Disposed on the exterior sides of the box are vertical elongated tab members. Such vertical tab members are interconnected with a horizontal member between two adjacent tab members. The horizontal member is arranged and configured so as to be selectively interlockable in concrete and the like thereby preventing the box from exposing an opening in the concrete should an open area be formed beneath the meter box. In the second embodiment, the cover may be of one piece construction having a downwardly extending flange member arranged and configured so as to rest on the ledge member of the meter box and confront the rim. The cover may also comprise first and second sections and pin means for rotatably joining the first and second sections together. The first section is coupled to the first end of the meter box by a plurality of protrusions which are yieldably engaged in the slots in the meter box so as to render the first section substantially immovable therein. The second section is coupled to the meter box and has uniquely designed means for lifting the second section off the meter box and to move it about the pin means whereby the meter box is selectively opened and closed.

It is therefore one object of the present invention to provide a meter box having a cover which is lightweight yet relatively inexpensive and easy to produce.

Yet another object of the present invention is to provide a meter box which can be selectively interlocked into concrete and the like.

Yet a further object of the present invention is to provide a meter box with a rotatable cover which cover may be selectively opened and closed to expose the contents of the box without requiring complex equipment.

The novel features which are believed to be characteristic of this invention, both as to its organization and method of operation together with the further objective and advantages thereof, will be better understood from the following description together with the accompanying drawings in which a presently preferred embodiment of the invention is illustrated by way of example. It is to be expressly understood, however, that the drawings are for the purpose of illustration, and description only, and are not intended as a definition of the invention.

BRIEF DESCRIPTION OF THE DRAWING

FIG. 1 is an exploded perspective view of the first embodiment of the present invention showing the axially rotatable cover and the circular meter box. FIG. 1 also indicates how a box of substantially the same construction can be disposed in a bottom-to-bottom configuration.

FIG. 2 is a top perspective view of the meter box and cover showing the outwardly extending protrusions on the cover interlocked in the ledge member of the box.

FIG. 3 is a fragmentary sectional view taken through lines 3—3 of FIG. 2 showing that the ledge member is created by the rim member and continuous side member of the side box.

FIG. 6 also indicates how a box of substantially the same construction can be disposed in a bottom-to-bottom configuration thereby interlocking two such boxes together.

DETAILED DESCRIPTION OF THE INVENTION

Figure 4:
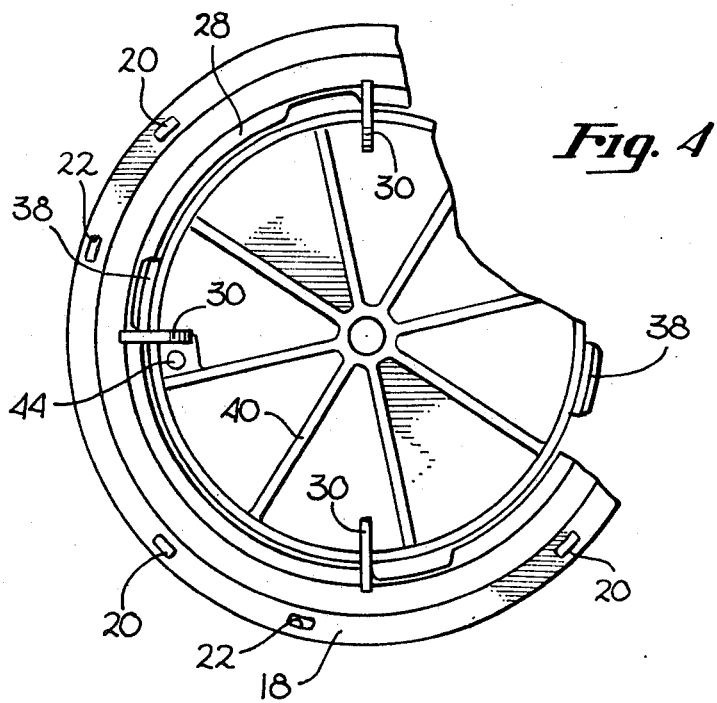
FIG. 4 is a bottom view of the meter box showing the support members used to support the cover member.

Referring first to FIG. 1, there is shown, as the first embodiment of the invention, a meter box 10 of a generally hollow cylindrical construction which has an open upper top section 14 and a generally continuous, downwardly extending and tapered bottom section 16. The top section 14 of the meter box is arranged and configured so as to form an upwardly extending rim member 26. Rim member 26 is also of a general round construction and includes a plurality of outwardly extending cover slot members 32. Rim member 26 is disposed on the meter box 10 so as to extend inwardly from the bottom section 16. This forms a ledge member 28 thereinbetween. Disposed on the interior wall of the meter box 10 so as to extend downwardly from the rim member 26 are a plurality of inwardly extending support members or protrusions 30. Support member 30 abut the interior wall of the box 10, as well as the ledge member 28, and are arranged and configured such that the cover member 12 (hereinafter described) is fully supported by such support members 30 so as to be able to support a substantial load. Disposed on the interior of the rim 26 are rim supporting ribs 34. Supporting ribs 34 add support to the rim member 26 and enable the meter box 10 to withstand substantial loads.

Extending outwardly from the bottom 16 of the meter box 10 is an outwardly extending ledge member 18. Ledge 18 forms additional support for the meter box and prevents damage to the box because of poor distribution of the load. Ledge 18, which is a continuation of the continuous side wall of the meter box, is also disposed against the side wall by a plurality of lower supporting ribs 24.

Finally, outwardly extending ledge member 18 has a plurality of slots 22 and associated dogs or leg members 20 disposed thereon. Leg members 20 extend downwardly from the ledge member and are arranged and configured such that a meter box 10a of substantially the same construction as meter box 10 can be coupled thereto in a bottom-to-bottom and ledge to ledge configuration. In such configuration, the lower meter box 10a which has a lower rim member 18a is positioned such that slots 22a interlock with leg members 20 of the upper box 10 and leg members 20a fit into slots 22. This type of interlocking means has been found to enable two meter boxes of the present invention to be selectively interlocked thereby effectively doubling the volume therein so as to encase substantially larger meters or other underwater objects therein. Of course, it is to be understood that other means for interlocking two such meter boxes together is also within the scope of the invention. For example, means could be provided which extend over the respective ledge members of each of the two meter boxes and interlock such boxes together.

Cover member 12 is also of a generally circular configuration and has a downwardly extending flange member 36. Flange member 36 has two outwardly extending tabs or protrustions 38 which fit through cover slots 32. This enables the protrusions to extend beneath the upper rim member 14. Cover member 12 also has a plurality of radially disposed supporting ribs 40 which enable the cover member to support a substantial amount of weight. Disposed on the top of cover member 12 are two openings 42 which permit the user to rotate the cover member when disposed on the meter box as hereinafter described. Of course, other means, such as, for example, a handle, can be disposed on the meter box to enable the user to rotate such member. The meter box 10 also has an opening or hole 46 disposed therethrough which permits the locking member, such as, for example, bolt member 44 to be selectively engaged by the meter box between locked and unlocked positions.

Referring now to FIG. 2, the cover 12 has been inserted on the meter box so as to rest on the inwardly extending cover support members 30. The downwardly extending flange 36 of the cover 12 abuts the interior of rim 26 but there is sufficient space between these two members such that the cover 12 is axially rotatable therein. This figure also indicates the positioning of the protrusions 38 after the cover has been rotated. The original position of such members is indicated by the dashed lines 38a and 38b. One can see, that after the cover 12 has been rotated, the protrusions 38 are disposed beneath the ledge member 28 such that the cover cannot be lifted directly off the meter box 10 without once again rotating the cover member 12 back to its original position.

Figure 5:
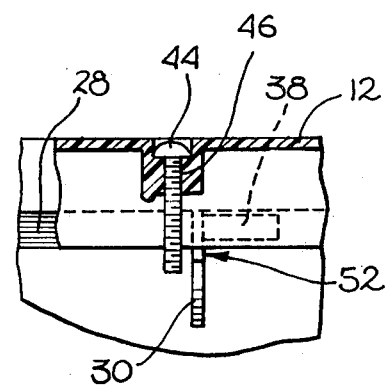
FIG. 5 is a partial fragmentary sectional view showing how the cover is locked into position by positioning a support member between a bolt and a protrustion on the cover.

Referring now to FIGS. 3 and 4, one can see that in the close position, the protrusion 38 on the cover 12 is permitted to rotate until they abut predetermined support members 30. Referring specifically to FIG. 4, bolt member 44 may be inserted such that support member 30 is disposed between protrusion 38 and bolt member 44. Referring to FIG. 5, positioning of the bolt member 44 in opening 46 enables the cover 12 to be securely locked in position. In FIG. 5, the bolt 44 has been inserted so as to extend beneath area 52 such that the support member 30 is disposed between the bolt 44 and the protrusion 38. In this position complete rotation of cover 12 would be prevented.

In operation the meter box and cover of the first embodiment of the present invention, the round meter box 10 is set in position such that the pipe passes through openings 50 disposed through bottom 16 of meter box 10. Tab members shown with respect to FIG. 6 may also be disposed along the exterior wall of the round meter box so as to lock the meter box in concrete and the like if this is desired. Such interlocking action of the tab members will be discussed with reference to the second embodiment of the present invention.

Next, the cover 12 is disposed on the top 14 of the meter box 10 such that protrusions 38 line up with outwardly extending cover slots 32. As the cover is set in position, the flange section 36 of the cover 12 abuts the inside of the upwardly extending rim member 26. The protrusion 38 are arrange and configured so as to fit through slots 32 and pass beneath ledge 28 when the cover is rotated. In the presently preferred embodiment, the cover is rotatable in one direction only. This is because the support members 38 are disposed adjacent the ledge 28 such that the protrusions 38 abut such support members when rotated in a counterclockwise position. More specifically, in the presently preferred embodiment, the cover is rotatable between a first open position (the position the cover occupies when initially placed on the meter box 12) to a second closed position. Accordingly, when in the first position, the cover 12 is removable from the meter box 10. When in the second position, the cover has been rotated and the protrusions 38 are now disposed beneath ledge 28. Thus, in the second position, the cover 12 is not removable from the meter box 10. In the preferred embodiment, the cover 12 is rotatable in a clockwise position until protrusion 38 abuts against support member 30 (see FIG. 4). Once in this position, a locking means may be disposed through the cover so as to position the support means 30 between the protrusion 38 and the locking means. In the presently preferred embodiment, such locking means is comprised of a downwardly extending bolt member 44 disposed through opening 46. Reference to FIG. 5 shows that when in the locked position, the bolt 44 is disposed beneath space 52 such that the bottom of the bolt 44 is beneath the top of the support member 30. Space 52 is of a predetermined length and is created such that when the bolt is raised a predetermined distance, the bottom of bolt 44 passes through space 52 and does not engage or otherwise abut support 30. When in this unlocked position, the bolt 44 enables the cover 12 to be rotated to its initial position such that protrusions 38 are now once again in alignment with slots 32. The cover, in this first unlocked position, is now removable from the meter box 10.

Figure 6:
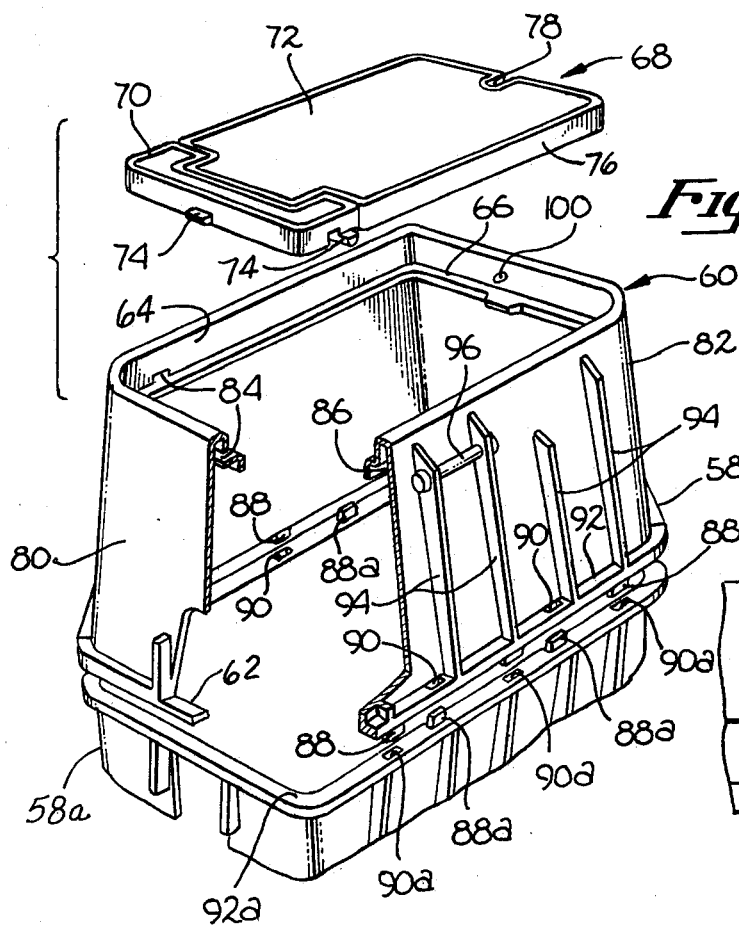
FIG. 6 is an exploded perspective view of the second embodiment of the present invention showing the two part cover and how it is disposed within the peripheral rim of the meter box.

Referring now to FIG. 6, there is shown, as the second embodiment, a meter box 58 having side members with first and second ends 80 and 82 respectively arranged and configured to form a basically complete generally rectangular structure having open top end 60 and an open bottom 62. The open top 60 of the box 58 is provided with an inwardly extending peripheral ledge 66 joined to an upwardly extending rim 64. Rim 64, in the presently preferred embodiment, is a continuation of each of the respective sides of the box 58. Note that rim 64 and the sides of the box 58 are one continuous discrete molded section which has a generally smooth appearance and simple design. This permits the molding techniques to make the box 10 of the invention quickly and at a relatively low cost. One can see in this figure that ledge member 66 extends inward towards the center of the box 58 and is preferably supported by a plurality of supporting rib members 86, which are disposed on the inside surface of the box beneath and abutting ledge member 66. Rib members 86 add substantial support to the ledge 22 and enable a cover member 68 (hereinafter described) to support great weight and thereby protect the contents of the box. The box 58 also has a second outwardly extending ledge 92 adjacent to the bottom thereof. Ledge 92 forms additional support for the meter box and prevents damage to the box because of poor distribution of the load. Ledge 92, which is a continuation of each of the side members of the box 58, is also buttressed against the side members of a plurality of anchor members 94. Anchor tab members 94 represent a point of novelty and a distinct importance over the prior art. Because of their design, they permit the meter box 58 to be easily molded without the need for expensive four-part explodable molds and related equipment. This also increases the ability of the box 58 to withstand heavy loads.

Because tabs 94 are elongated rib-like members, and are vertically disposed on the box 58, they slide out of the mold with minimal effort. In the preferred embodiment, tab members 94 extend outward from the sides of the meter box 58 a sufficient distance adjacent to top 60 thereof so as to permit bolt member 96 to be coupled between two such tab members. A bolt 96 disposed adjacent the top 60 has been found to be the solution to the problem of simple means to secure the meter box 58 in concrete and the like. Merely providing the meter box with a molded horizontal section does not solve the problem as such sections require expensive four-part exploded molds in order to extract such a part out of the mold. Moreover, a molded horizontal section which extends out a sufficient distance to be locked into the concrete is susceptible to breakage prior to use. These problems are solved by the use of the insertable bolt member 96. However, it should be noted that to prevent the meter box 58 from dropping into an opening created beneath it, it must be locked into the upper concrete layer. Thus, there is a specific reason and need for (i) the tab members 94 to extend outwardly adjacent the top 60 of the box 58; and (ii) the bolt 96 to be positioned adjacent the top 60 of the box 58.

Of course, it is to be understood, that other outwardly extending positioning means for locking the meter box 58 in concrete are also within the scope of this invention. For example, blade-like members could also be horizontally coupled between two tab members 94. Moreover, while it is preferred to use at least one horizontal member 96 on two opposed sides, more than two members 96 can be used on each side.

Disposed on the bottom of ledge member 92 are a plurality of downwardly extending coupling dogs or legs 88 and slots 90 arranged and configured such that an equivalently shaped meter box may be inverted and coupled to ledge 92 whereby the leg 88a on the inverted cover meter box are disposed in the associated slots 90 on the upper meter box and the legs 88 on the upper meter box are disposed in the slots 90a on the invert lower meter box. This second meter box is shown in FIG. 6 as meter box 58a and is substantially the same construction as box 58. In such a configuration, with the bottom ledges 92 and 92a of two such meter boxes, are joined together and the effective volume of such a configuration is twice that of one meter box alone. Thus, it is within the scope of this invention, to couple two such meter boxes together whereby meters or other valuable contents may be stored and protected within the meter box without the need for making various different size boxes, i.e., by making one meter box which can be coupled together, economies of scale are achieved by producing one size box which can be selectively joined to another.

In the presently preferred embodiment, the sides are tapered such that the bottom 62 and bottom ledge 92 are larger than the top 60 and top rim 64, i.e., each of the sides tapers upward and toward the center of the top of the meter box 58. This tapering adds to preventing the box from being easily removed from the ground or from concrete once in place. It is to be understood, however, that other configurations of the box and sides are also within the scope of this invention. For example, the meter box can have a generally tubular shape and can be tapered whereby the top of the meter box is larger than the bottom of the meter box such that after it is disposed in the ground, the meter box would be easily removable therefrom. In the presently preferred embodiment, both meter boxes 10 and 58 are made of polyethylene, polypropylene, ABS, and other similar rigid plastic materials, with or without various reinforcing fillers.

Also shown in FIG. 6 is the cover 68. Cover 68 has a first section 70 and a second section 72, each rotatably coupled to each other by a pin member as more fully described in copending application, Ser. No. 601,047 now U.S. Pat. No. 3,952,908. The cover 68 has a downwardly extending peripheral flange member 76 which completely encircles the cover and is arranged and configured such that when the cover is disposed on the ledge 66, the bottom of flange 76 rests on ledge 66 and abuts rim 64 thus closing off the top end 60 of the box 58. Note that first section 70 of the cover 68 has a plurality of outwardly extending protrusions 74 which are selectively disposed in the first end 80 of the meter box 58. Second section 72 of the cover 68 has an opening 78 disposed at the end thereof which abuts second end 82 of the box 58. Opening 78 permits section 72 to be selectively opened and closed whereby access may be gained to the box.

When the cover 68 is disposed on the open top end 60 of the box 58, the flexible protrusions 74 are selectively engaged in associated slots 84. In the presently preferred embodiment, three such protrusions 74 and associated slots are disposed on the first section 70 of the cover 68, and the first end 80 of the meter box 58. In the covers of the prior art, usually only one such interlocking means was disposed on one end of the cover. Because the present invention uses a plurality of such interlocking means, the cover 68 of the second embodiment of the present invention is more securely coupled to the box 58 than the prior art and prevents the first section 70 from being easily removed from the box 88.

The first section of 70 of the cover 68 has a generally U shaped appearance with two substantially parallel and spaced apart sections, joined by an elongated leg member. In the presently preferred embodiment, one protrusion extends outwardly from each of the parallel spaced apart sections and one extends outwardly from the leg member. Of course, it is to be understood, that other means to couple the cover 68 to the box 58 are within the scope of this invention. In addition, other configurations for the protrusions 74 as well as the entire cover 68 may also be utilized. For example, cover 68 may have a generally circular (rather than rectangular) shape, and may be of one-piece construction.

In using the meter box 58 of the present invention, a hole is first dug in the ground, exposing the pipe or other object which one desires to protect by the instant meter box 58 and associated cover 68. The box 58 is disposed in the ground over the desired object, and the cover 68 is disposed atop the meter box. This is done by first aligning protrusions 74 with their associated slots 84. Once first section 70 is snapped in place, each of the protrusions 74 on section 70 will spring outward and be securely engaged in the associated slots 84. After first section 70 is in place, the second section 72 may be selectively opened and closed. When in a closed position, a pin-like protrusion 100 disposed adjacent the second end 82 of the meter box 58 engages the second section 72 of the cover 68 so as to selectively couple the second section to the meter box. Of course, other means for coupling the cover 68 to the box 58 are within the scope of this invention. For example, downward extending bolt or screw members which engage the box 58 and the cover 68 may also be used.

Figure 7:
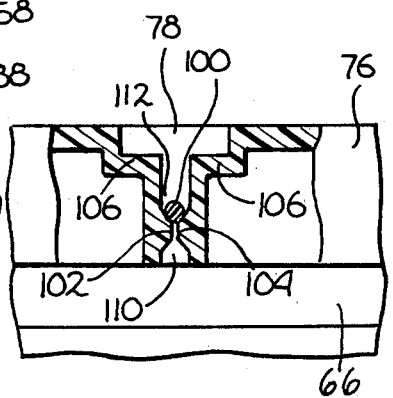
FIG. 7 is a sectional view of the meter box showing the means used to drawing the second section of the cover to the meter box, such that the cover is held in place, but which is relatively easy to open without the need for any uniquely designed tool or other instrument.

Referring now to FIGS. 6 and 7, one can see that in the presently preferred embodiment, protrusion 100 is engaged by two downward extending flange sections 106. More specifically, these sections 106 are sections of supporting ribs disposed underneath cover 68 and provide the cover 68 with additional support. Flange sections 106 form opening 78 which is arranged and configured such that protuberances 102 and 104 on the flanges 106 are disposed adjacent to protrusion 100. When one desires to close the meter box, the protrusion 100 proceeds up opening 110 until it engages protuberances 102 and 104. These are then flexed outward and spring back in position with the pin disposed in area 112. In this position, the cover 68, and specifically the second section 72, is in the closed position thus closing off the top 60 of the box 58. When one desires to open the cover 68, no special tools or equipment are needed. One can see that opening 78 proceeds a predetermined distance down through the second section 72 of cover 68. One need only extend a lifting tool, such as, for example, a screw driver and the like, into opening 78 and underneath the cover 68 and lift in a generally upward direction thereby causing protrusion 100 to flex section 102 and 104 outwardly, and thereby disengage protrusion 100 from engagement with flanges 106.

To lock and firmly position the box 58 into the concrete, a bolt 96 is disposed through two adjacent anchor tabs 94. This provides the box 58 with a horizontal member. As the concrete is poured about the top section 60 of the box 58, the bolt 96 becomes interlocked into the concrete. Inasmuch as only the top of the meter box 58 will normally have concrete disposed thereabout, it is important that the taps 94 extend outward from the box 58 adjacent the top thereof, and in the preferred embodiment, within 4 inches of the top of rim member 64. Once locked into the concrete, should the ground settle beneath the box 58 so as to create an opening into which the box could fall, the box 58 will remain locked into the concrete because of members 94 and 96. Thus, a dangerous pit in the concrete is prevented.

There have been described herein new and novel meter boxes and associated covers which provide in ground protection for pipes and pipe related objects. However, it is to be understood that various alternative embodiments using the principles of the present invention may readily be incorporated. For example, the dog members 58 may be removed, and a wide variety of shapes and sizes of the box and cover may also be used. Thus, while two specific embodiments of the present invention have been disclosed and described in detail herein, it will be understood by those skilled in the art that various changes in form and detail may be made herein without department from the spirit and scope of the invention.

I claim:

1. A meter box assembly comprising:
   a. a round meter box having an open top with an upwardly extending rim forming a ledge member and a plurality of inward extending support members disposed on the inside surface of said box adjacent the top thereof, said support members disposed beneath said rim a predetermined distance;
   b. a cover member configured so as to rest on said support members and being axially rotatable between a first open position and a second closed position, said cover having means for engaging said ledge member when in said first position, said means for engaging said ledge member are disengaged therefrom and said cover is removable, and when in said second position, said means for engaging said ledge member engage said ledge member thereby preventing removal of said cover from said box; and
   c. locking means, said locking means disposed on said cover such that when said cover is in said second position, actuation of said locking means prevents the substantial rotation of said cover in any direction.

2. The meter box according to claim 1 wherein said means for engaging said ledge member on said cover comprises an outward extending protrusion.

3. The meter box according to claim 2 wherein said locking means is configured on said cover such that when said cover is in said second poition, actuation of said locking means positions a predetermined support member between said locking means and said protrusion on said cover.

4. The meter box according to claim 1 wherein a plurality of downward extending leg members and a plurality of associated openings are disposed adjacent the bottom of said meter box.

5. The meter box according to claim 4 wherein said meter box is coupled to a substantially similar second meter box such that said legs and openings of each said meter box are interconnected.

6. A meter box assembly comprising:
   a. a meter box formed of a continuous side member having an open top with an upwardly extending rim member terminating on the inside surface of said box near the top thereof in an inwardly extending ledge member, disposed on the exterior surface of said box are a plurality of outwardly extending anchor tabs, wherein a predetermined number of said anchor tabs are joined by a bolt, said bolt disposed between said tabs so as to be adjacent said top of said box for locking said box into concrete and the like; and
   b. a cover comprising first and second sections and means for rotatably joining said first and second sections together, said first section having means for engaging said meter box so as to render said first section substantially immovable therein, said second section having means for lifting said second section and moving said second section about said means rotatably joining said first and said second sections together, whereby said meter box is selectively opened and closed.

7. A meter box assembly comprising:
   a. a meter box formed of a continuous side member having an open top with an upwardly extending rim member terminating on the inside surface of said box near the top thereof in an inwardly extending ledge member, disposed on the exterior surface of said box are a plurality of outwardly extending anchor tabs, a number of said anchor tabs being joined by positioning means, said positioning means disposed between said tabs so as to be adjacent said top of said box for locking said box into concrete and the like; and b. a cover arranged and configured so as to rest on said ledge member and confront said rim on said box; and c. a plurality of downwardly extending leg members and a plurality of openings disposed on said meter box adjacent the bottom thereof.

8. The meter box according to claim 7 wherein said meter box is coupled to a substantially similar second meter box such that said legs and openings of each said meter box are interconnected.

9. A meter box assembly comprising:

a. a meter box having an open top with an upward extending rim member terminating on the inside surface of said box near the top thereof in an inwardly extending ledge member, said ledge member being supported by a plurality of rib members, said rib members being coupled to the inside of said box adjacent the top thereof and abutting said ledge member;

b. a cover arranged so as to rest on said ledge member and confront said rim, said cover having locking means for selectively interlocking with a protrusion on said box, said locking means being downward extending flexible flange sections coupled to said cover and selectively engaging said protrusion; and c. a plurality of downward extending leg members and a plurality of associated openings disposed adjacent the bottom of said meter box.

10. The meter box according to claim 9 wherein said meter box is coupled to a substantially second meter box such that said legs and openings of each said meter box are interconnected.

* * * * *